United States Patent [19]

Kinoshita

[11] Patent Number: 5,629,603
[45] Date of Patent: May 13, 1997

[54] ELECTRIC SYSTEM OF ELECTRIC VEHICLE

[75] Inventor: Shigenori Kinoshita, Kawasaki, Japan

[73] Assignee: Fuji Electric Co., Ltd., Kanagawa, Japan

[21] Appl. No.: 170,906

[22] Filed: Dec. 21, 1993

[30] Foreign Application Priority Data

Dec. 25, 1992 [JP] Japan ..................... 4-359576
Feb. 2, 1993 [JP] Japan ..................... 5-037386

[51] Int. Cl.$^6$ ..................... B60L 11/18
[52] U.S. Cl. ..................... 320/11
[58] Field of Search ..................... 320/31, 11, 2, 320/21, 59, 61, DIG. 2, 39

[56] References Cited

U.S. PATENT DOCUMENTS 5,214,369  5/1993  McCrea ..................... 320/21

FOREIGN PATENT DOCUMENTS 0493848   7/1992  European Pat. Off. .
59061402  4/1984  Japan .
59-61402A 4/1984  Japan .

*Primary Examiner*—Aditya Krishnan
*Attorney, Agent, or Firm*—Spencer & Frank

[57] ABSTRACT

An electric system of an electric vehicle, in which an AC voltage is applied from an external AC power source to the inverter via windings of an AC motor during the charging operation of a main secondary battery. The inverter has a regenerative function enabling reverse conversion, and the motor windings operate as reactors. A contactor whose first terminals are connected to terminals of the windings and whose second terminals are shortcircuited is provided. The first terminals of the contactor are connected via connecting lines to a charging connector which is to be connected to the external power source. A portion of the vehicle body is connected to the charging connector via a ground line, and is grounded. The contactor is opened when the main secondary battery is charged, and is closed when the electric vehicle is driven.

20 Claims, 15 Drawing Sheets

FIG.4A  $v_M$  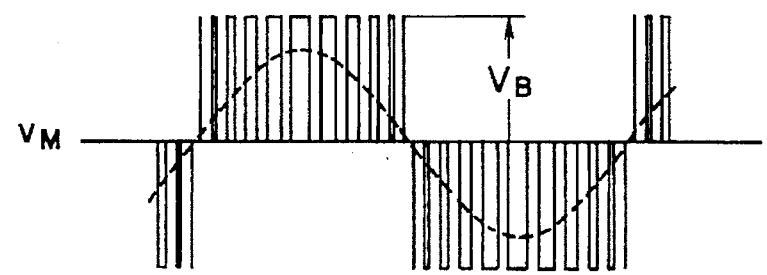
FIG.4B  $i_M$  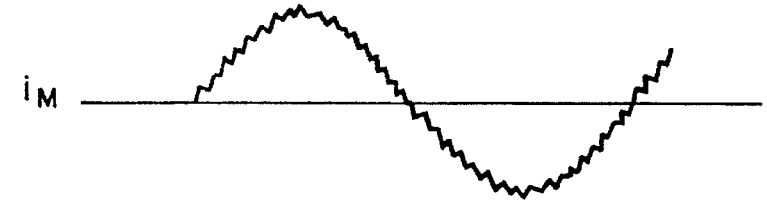
FIG.4C  $v_B$  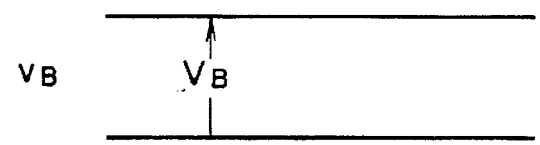
FIG.4D  $i_B$  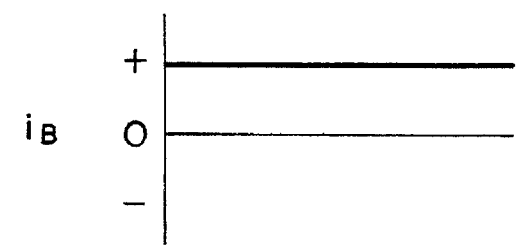

ELECTRIC SYSTEM OF ELECTRIC VEHICLE

BACKGROUND OF THE INVENTION

1. Field of the Invention

The present invention relates to an electric system of an electric vehicle using a main secondary battery as a power source.

2. Description of Related Art

FIG. 1 shows a drive system of a conventional electric vehicle which uses a main secondary battery (hereinafter, referred to simply as a secondary battery) as the power source. This figure shows a drive system for driving two wheels by a single AC motor. In FIG. 1, the reference numeral 1 designates a secondary battery, the reference numeral 2 denotes a main contactor, the reference numeral 3 designates a fuse, the reference numeral 4 denotes an inverter, the reference numeral 5 designates an AC motor, the reference numeral 6 denotes a triple pole contactor for opening a motor circuit, the reference numeral 7 designates a reduction gear unit, and the reference numeral 9 denotes a differential gear unit.

In this drive system, the rotation of the AC motor 5 is decelerated by the reduction gear unit 7, and the decelerated rotation is transferred to the wheels 81 and 82 via the differential gear unit 9.

The inverter 4 is connected to the motor 5 through lines 60a, the triple pole contactor 6, and lines 60b, so that the triple pole contactor 6 breaks the lines 60a and 60b if a fault occurs on the side of the motor 5.

In the drive system shown in FIG. 1, the inverter 4 inverts the DC power of the secondary battery 1 into AC power, thereby controlling both the torque and rotating speed of the AC motor 5.

During the power running of the electric vehicle, the power is supplied from the secondary battery 1 to the motor 5 via the inverter 4 which inverts the DC power into the AC power, so that the wheels 81 and 82 are rotated and consequently the vehicle body is driven. During the regenerative braking, the kinetic energy of the vehicle body is regenerated to the secondary battery 1 via the wheels 81, 82, the motor 5, and the inverter 4 which converts AC to DC in the direction opposite to that during the power running.

In general, the inverter of the electric vehicle is arranged in the form of a 3-phase transistor inverter as shown in FIG. 2.

In FIG. 2, the reference numeral 401 designates a transistor, and the reference numeral 402 denotes a diode connected in antiparallel to the transistor 401. The major circuit of the 3-phase inverter is composed of six arms, each of which consists of a switching element combining the transistor 401 and the diodes 402. The reference numeral 403 designates a capacitor for smoothing the current from the secondary battery 1.

FIGS. 4A–5D illustrate voltage waveforms and current waveforms of respective portions of the drive system during the drive operation of the electric vehicle. Generally speaking, the inverter for driving the electric vehicle employs the same PWM control as industrial AC motor driving systems. These figures illustrate the PWM control method. It should be noted that FIG. 3 shows a circuit arrangement for explaining the voltages and currents in FIGS. 4A–4D (the power running operation mode), and FIGS. 5A–5D (the regenerative braking operation mode).

As is apparent from FIGS. 4A–5D, the voltage VB of the secondary battery 1 is subjected to the PWM control by the inverter 4 to be converted to the an AC-side voltage $V_M$ of the inverter 4, which takes such a waveform as shown in FIG. 4A. The waveforms during the power running operation and regenerative braking operation are similar. A waveform indicated by a dotted line in FIG. 4A represents a fundamental wave of the PWM control. The PWM control is carried out in such a manner that this fundamental waveform becomes a sine wave. Thus, the AC-side current $i_M$ of the inverter 4 takes such a waveform as superimposing higher harmonic currents on the fundamental wave current.

The examples shown in FIGS. 4A–5D are when the power factor of the fundamental waves is 1. As shown in these figures, the phases of the currents during the braking operation mode (FIGS. 5A–5D) and the power running operation mode (FIGS. 4A–4D) are opposite, and hence, the braking operation becomes the regenerative operation. Similarly, the polarity of the DC-side current $i_B$ is also inverted during the braking operation.

Since the stored energy of the secondary battery on an electric vehicle is finite as the power source, the battery must be properly recharged. This battery charging operation is a major problem in using electric vehicles.

In other words, the charging operation of the secondary battery and a charging device are essential in using electric vehicles.

FIG. 6 shows a conventional charging system. The reference numeral 100 designates an electric vehicle, in which the same reference numerals are used as in FIG. 1.

In FIG. 6, the reference numeral 300 denotes a charging device connected to the secondary battery 1 via a charging cable 400 and a charging connector 200 which is connected to the secondary battery 1. The charging device 300 is connected to a connector 220 of an external power distribution system 240 via a cable 700.

During the charging operation, the main switch 2 of the electric vehicle 100 is opened, so that the secondary battery 1 is charged with the power from the power distribution system 240 using the charging device 300.

FIG. 7 shows the conventional charging device 300. In this figure, the reference numeral 301 designates an AC-side contactor, the reference numeral 302 denotes a step-down transformer provided as necessary, the reference numeral 303 designates a diode rectifier for converting an AC voltage into a DC voltage, the reference numeral 304 denotes a chopper controlling a charging current, the reference numeral 305 denotes a reactor for smoothing a charging current, and the reference numeral 306 designates a fuse.

Generally, the charging device must charge the secondary battery 1 quickly. Therefore, the capacity of the charging device 300 must be selected to be equal to or greater than that of the inverter for driving the AC motor of the electric vehicle. Thus, the charging device 300 must be necessarily made bulky, and a charging operation becomes complicated, because the charging device must have a large capacity, and include the power converter such as the diode rectifier 300, as well.

It is essential for driving electric vehicles regardless of time and space to install charging stations as shown in FIG. 8 at many places as is common with gasoline stations for internal combustion engines.

However, it is difficult to install the above-explained conventional charging system at a large number of places, because the charging device 300 is bulky and expensive. This presents a problem in widely spreading the electric vehicles.

Furthermore, the charging device 300 has the rectifier load which is connected to the power distribution system 240. This presents another problem in that it will deteriorate the quality of power by causing higher harmonic waves in the power distribution system 240, and reduce the power factor.

SUMMARY OF THE INVENTION

It is therefore an object of the present invention to provide an electric system of an electric vehicle, which is capable of charging a secondary battery by merely being connected to an external AC power source like a power distribution system without employing a bulky and expensive charging device, and which is also capable of preventing the power quality of the power distribution system from being reduced during the charging operation, thereby eliminating the above-described problems.

The present invention has been made by taking account of the fact that a large-capacity inverter with a regenerative function is installed in an electric vehicle, and the inverter is not conventionally used for charging a secondary battery. In a normal mode, the electric vehicle is driven by an AC motor which is supplied with power from the inverter. In a charging mode, the inverter functions as an AC-to-DC power converter. A contactor is used to disconnect the motor from the inverter during the charging of the secondary battery.

More specifically, the contactor has first terminals and second terminals, the first terminals are connected to second terminals of the windings of the AC motor, and second terminals of the contactor are shortcircuited. The first terminals of the windings of the AC motor are connected to AC side of the inverter.

During charging of the secondary battery, the contactor is opened so that the AC motor is stopped and an AC voltage fed from an external AC power source is supplied to the inverter via the windings of the AC motor functioning as reactors. The inverter operates as an AC-to-DC converter, and charges the secondary battery.

On the other hand, when the motor drives the wheels, the contactor is closed so that the windings are Y connected and function as the windings of the motor. In this case, charging lines leading to the charging connectors are shortcircuited, and the charging operation of the secondary battery becomes impossible. During the charging operation of the secondary battery, it is preferable to PWM-control the power converter by a control circuit to improve current waveforms. The external AC power source may be either of a single-phase or a 3-phase power distribution system. It is preferable to insert a fuse between the power converter and the power distribution system.

A voltage peak value of the charging AC power source is preferably selected to be lower than the voltage of the secondary battery. During the charging operation of the secondary battery, it is also preferable that the wheels be automatically braked in order to prevent the electric vehicle from starting.

During the charging operation of the secondary battery, an electric shock to a human body must be prevented. For this purpose, a part of the body of the electric vehicle, on which one may touch during the charging operation, is grounded so that the body is kept at the ground potential.

In the conventional charging system as shown in FIGS. 6 and 16, the potential of the secondary battery is not equal to that of the power distribution system because the secondary battery is isolated from the power distribution system by an insulating transformer (a step-down transformer) during the charging operation. In contrast, in the present invention, since the secondary battery is charged directly from the power distribution system rather than via an isolating transformer, the potential of the secondary battery equals that of the power distribution system.

FIG. 16 is an explanatory diagram of the charging operation according to the present invention. The body 110 of the electric vehicle is insulated from the ground 242 by means of tires 120. The reference numerals 121 and 122 designate stray capacitances between the vehicle body 110 and the main circuit connecting lines that connect the secondary battery 1 to inverter 4, and the reference numeral 123 denotes a stray capacitance between the vehicle body 110 and the ground 242.

On the other hand, one of the lines or the neutral line of a power distribution system 240 is connected to the ground 242 through a ground line 251 on the side of the AC power source 250 such as a system transformer.

FIG. 17 shows the potential of the vehicle during the charging operation of the secondary battery. In this figure, Vs is the potential of the power distribution system 240 with regard to the ground, $C_{S1}$ is a combined capacitance value of the stray capacitances 121 and 122, and $C_{S2}$ is a capacitance value of the stray capacitance 123. From this figure, the ground potential $V_{110}$ of the vehicle body 110 is given by the following formula:

$$V_{110} = V_s \times C_{S1}/(C_{S1}+C_{S2})$$

From this formula, in order to set the ground potential $V_{110}$ of the vehicle body 110 to zero during the charging operation, the capacitance value $C_{S2}$ would have to be equivalently set at an infinite value.

Therefore, according to the present invention, during the charging operation of the secondary battery, the vehicle body 110 of the electric vehicle is connected to the ground through the charging connector and the charging cable, so that the ground potential of the vehicle body 110 under charging operation is set at zero.

In accordance with the present invention, the secondary battery is charged while the contactor is opened and the AC side of the inverter, functioning as the power converter, is connected via the windings of the AC motor to the power distribution system, functioning as the charging AC power source. In this case, the inverter operates in a manner similar to the regenerative braking operation of a conventional inverter, in which the AC power is converted into DC power. Thus, the secondary battery is charged.

The voltage of the secondary battery is preferably selected to be higher than the sinusoidal peak value of the AC-side voltage of the inverter. If the sinusoidal peak value becomes higher than the battery voltage, the AC-side voltage of the inverter should be reduced by using a step-down transformer.

When the electric vehicle is driven, the contactor is closed, so that the windings of the motor are normally connected, and the motor functions as the AC motor for driving the wheels.

Since the windings of the AC motor, which are connected between the inverter and the AC power source during the charging operation of the secondary battery, function as reactances for greatly suppressing the higher harmonic voltages induced by the PWM control of the inverter, the distortion of the current waveform of the AC power source is greatly reduced, resulting in a suitable waveform. Furthermore, disturbing influences of the voltage waveform caused by the PWM control on the AC power distribution system can also be greatly reduced.

Moreover, in accordance with the present invention, since the vehicle body of the electric vehicle is grounded during the charging operation of the secondary battery, the vehicle body of the electric vehicle is not charged to such a potential as may cause a risk to a human body.

According to the present invention, a large-scale, large-capacity conventional charging device containing an AC/DC power converter is not required. A low cost, compact, space saving electric system including the charging system can be implemented, which will greatly serve to widely spread the use of electric vehicles.

During the charging operation, since the reactance of the windings of the AC motor is utilized, the higher order harmonic waves and distortion can be reduced by employing a control method of the power converter such as the PWM control. In addition, the charging device can be operated under a unity power factor. This will serve to improve the power quality of the power distribution system.

Since either a single-phase or a 3-phase AC power source may be used as the charging AC power source, domestic power sources as well as industrial power sources may be readily employed, thereby removing a restriction on the power supply.

In addition, since the vehicle body of the electric vehicle is grounded through the grounding line within the charging cable and the charging connector during the charging operation of the secondary battery, there is no possibility that the vehicle body will be charged during the charging operation. As a result, it is possible to provide a safety feature for the charging system to protect the human body.

The above and other objects, effects, features and advantages of the present invention will become more apparent from the following description of an embodiment thereof taken in conjunction with the accompanying drawings.

BRIEF DESCRIPTION OF THE DRAWINGS

FIGS. 4A–4D illustrate voltage and current waveforms during the power running mode of the electric vehicle;

DETAILED DESCRIPTION OF PREFERRED EMBODIMENT

The invention will now be described with reference to the accompanying drawings.

Figure 1:
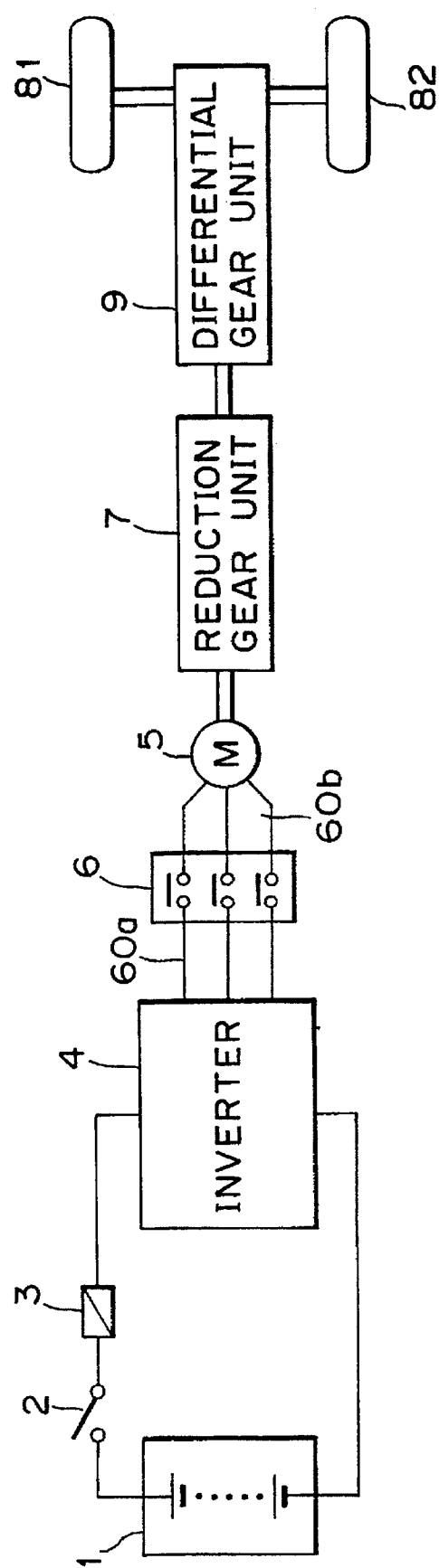
FIG. 1 is a diagram showing a drive system of a conventional electric vehicle.
Figure 2:
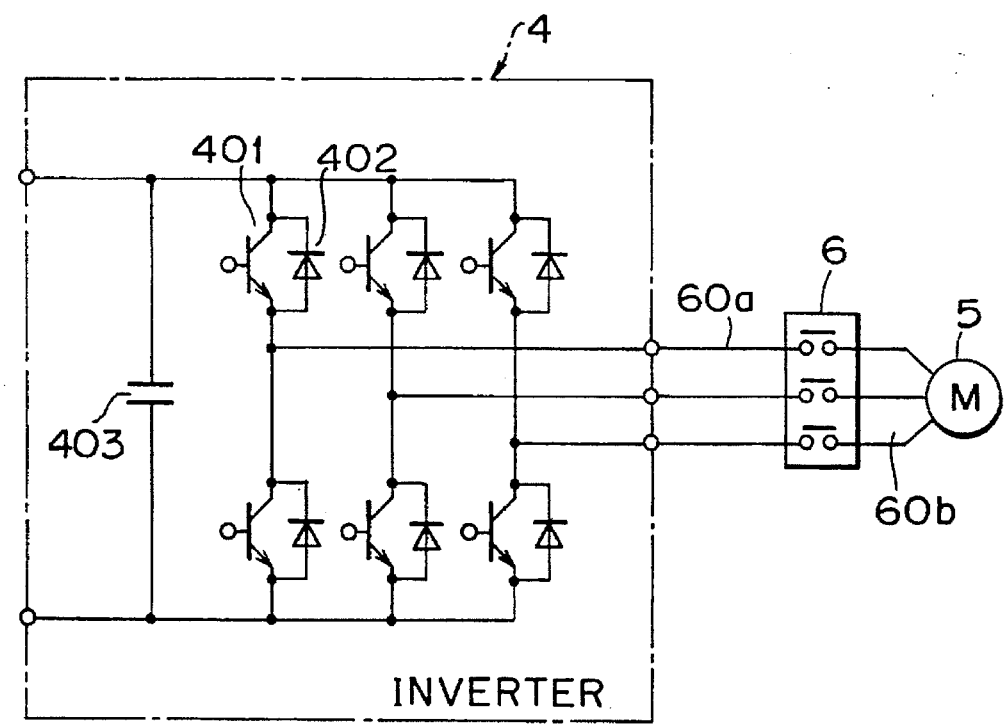
FIG. 2 is circuit diagram showing a major circuit of a 3-phase transistor inverter.
Figure 3:
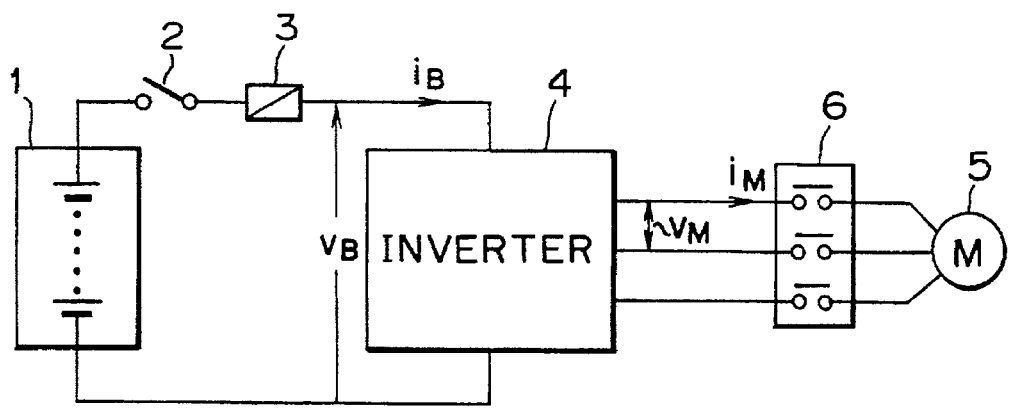
FIG. 3 is a circuit diagram showing voltages and currents of major portions of FIG. 1.
Figure 5A:
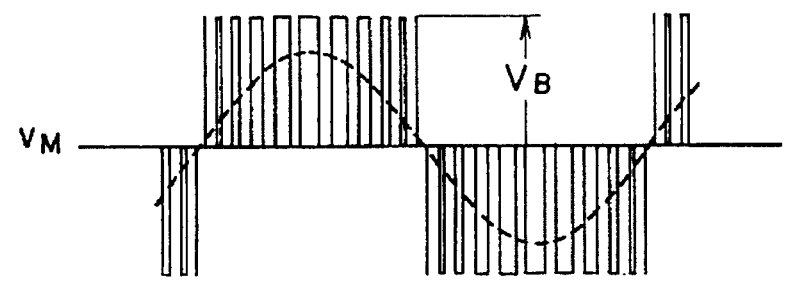
FIGS. 5A–5D illustrate voltage and current waveforms during the regenerative braking mode of the electric vehicle.
Figure 5B:
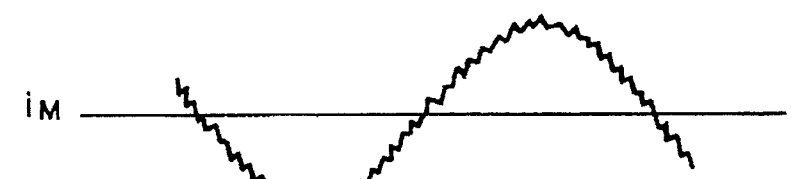
Figure 5C:
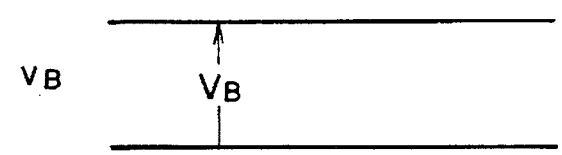
Figure 5D:
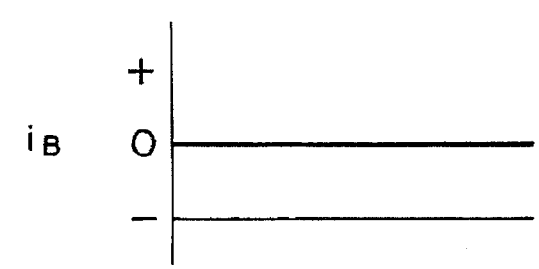
Figure 6:
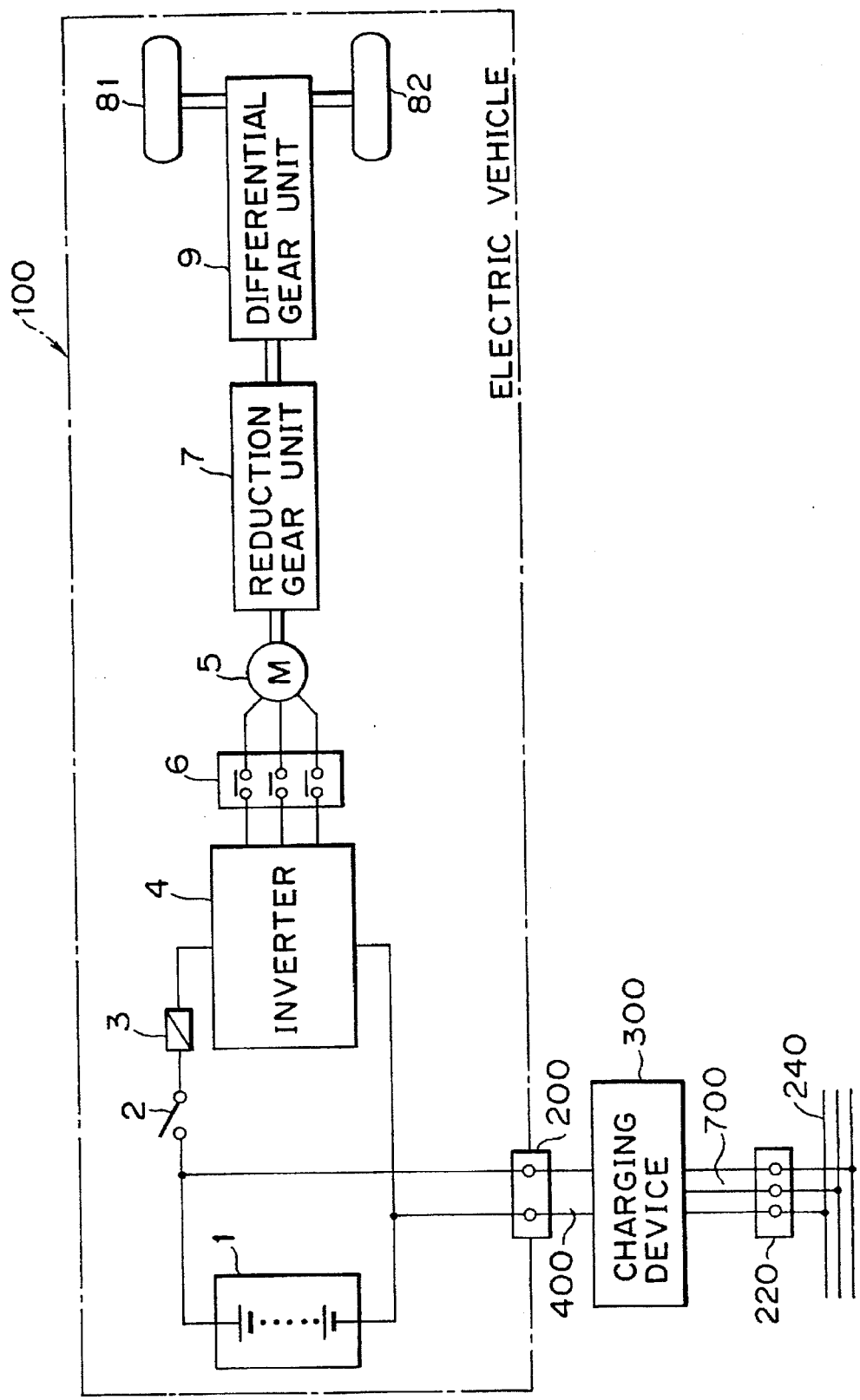
FIG. 6 is a circuit diagram showing a conventional charging system.
Figure 7:
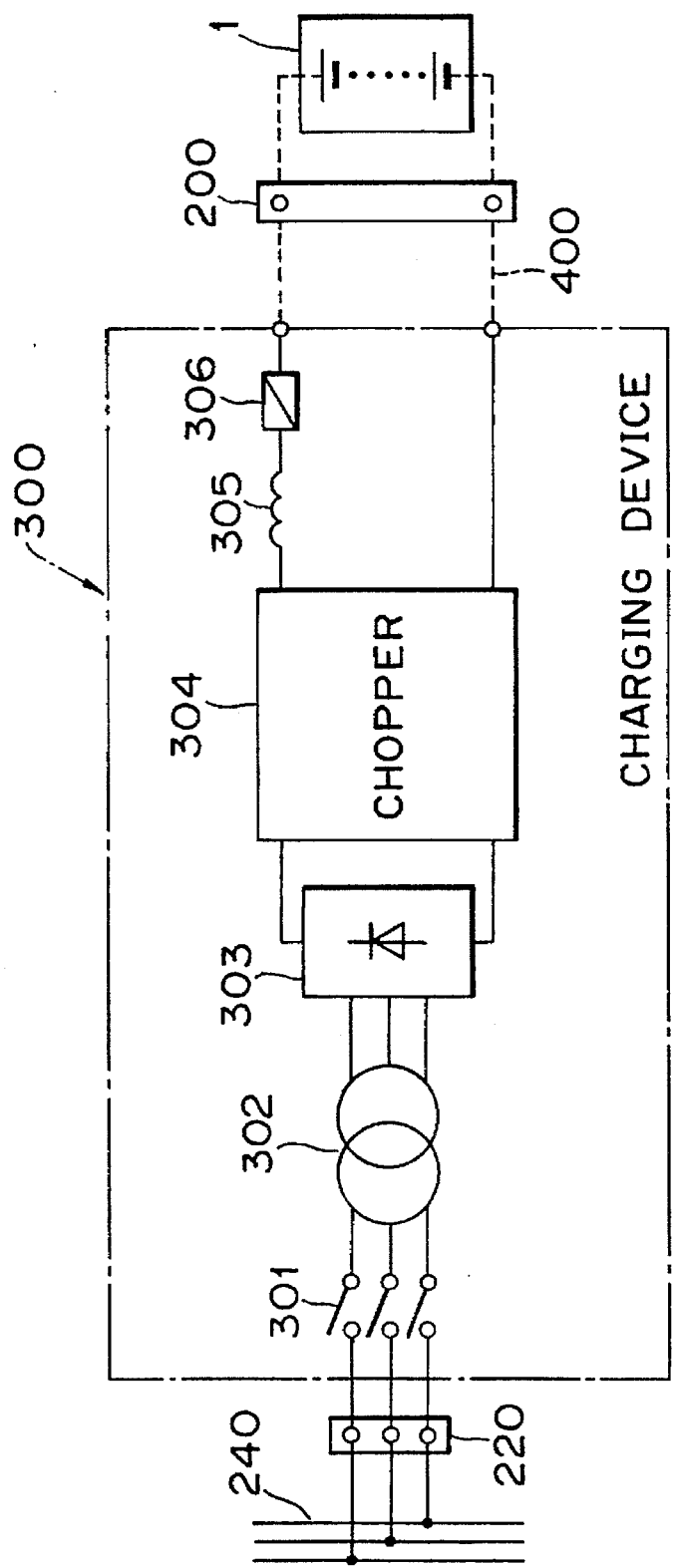
FIG. 7 is a block diagram showing the arrangement of a conventional charging device.
Figure 8:
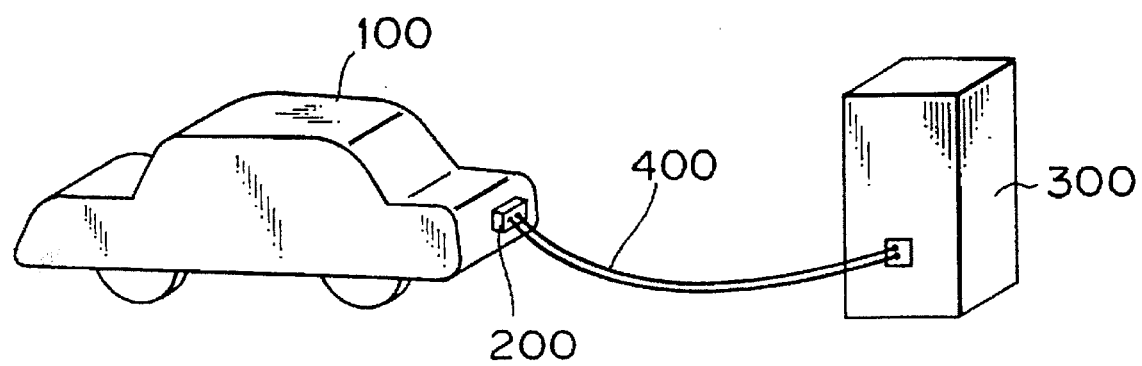
FIG. 8 is a schematic diagram illustrating a conventional charging operation.
Figure 9:
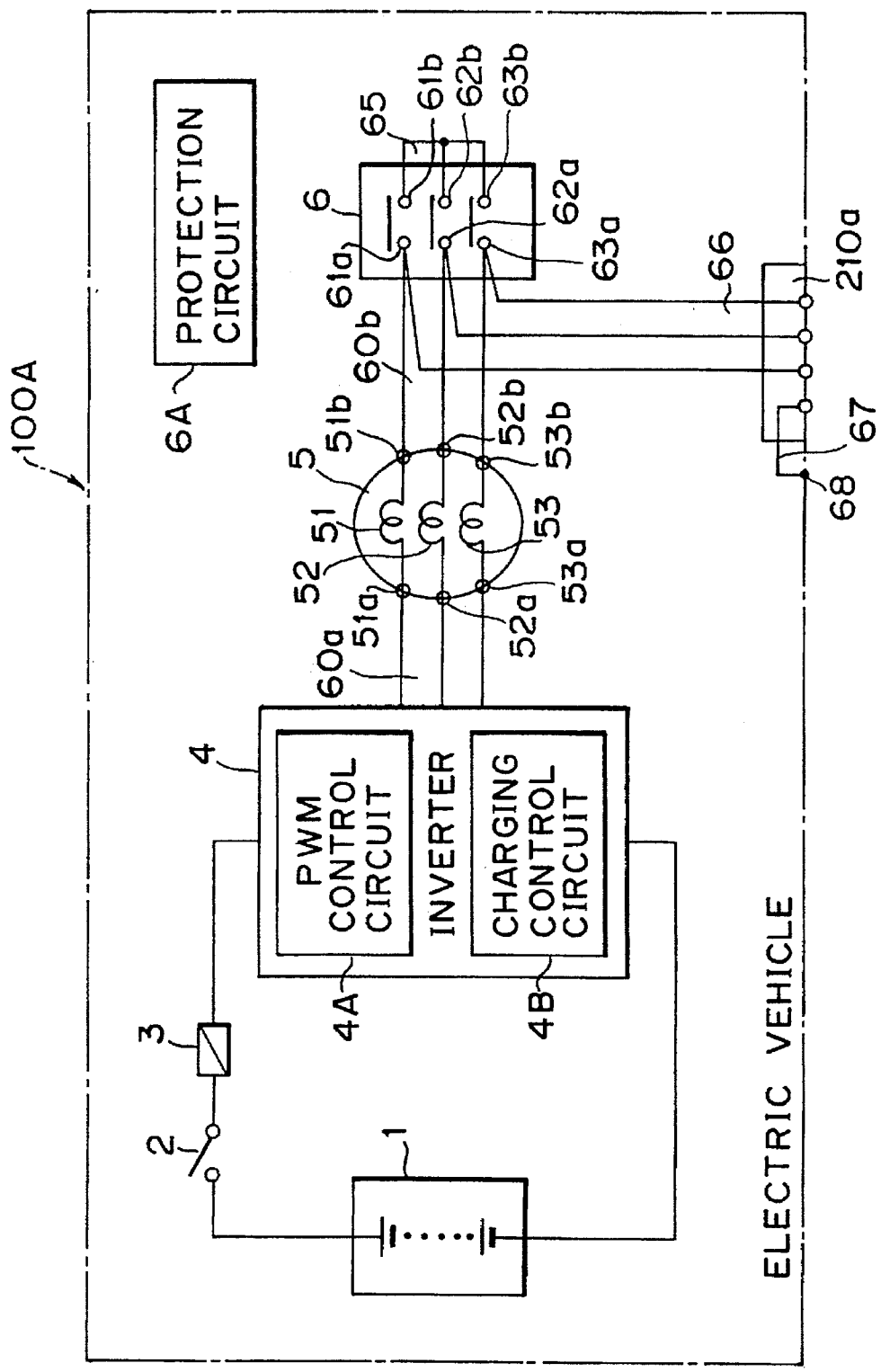
FIG. 9 is a circuit diagram showing one embodiment of an electric system of an electric vehicle in accordance with the present invention.

FIG. 9 shows an arrangement of a major portion of an embodiment in accordance with the present invention. In FIG. 9, like portions are designated by the same reference numerals as in FIG. 1, and the description thereof is omitted.

In an electric vehicle 100A according to this embodiment, the inverter 4 functions as a power converter performing forward/reverse conversions, having a regenerative function. The AC-side connecting lines 60a of the inverter 4 are connected to terminals 51a, 52a and 53a of the phase windings 51, 52 and 53 of the AC motor 5, respectively. The other terminals 51b, 52b and 53b of the windings 51, 52 and 53 are connected to terminals 61a, 62a and 63a of a triple pole contactor 6 via the connecting lines 60b, respectively. The other terminals 61b, 62b and 63b of the triple pole contactor 6 are connected to a shortcircuit line 65, so that these terminals are shortcircuited.

The terminals of charging connecting lines 66 are connected to the terminals of the triple pole contactor 6, respectively, and the other terminals of the lines 66 are connected to a charging connector 210a. One terminal of a vehicle-body ground line 67 is connected to the charging connector 210a, and the other terminal of this ground line 67 is connected to a vehicle-body ground line connecting unit 68 of the vehicle body 110. p Next, the operation of this embodiment will be described.

Figure 10:
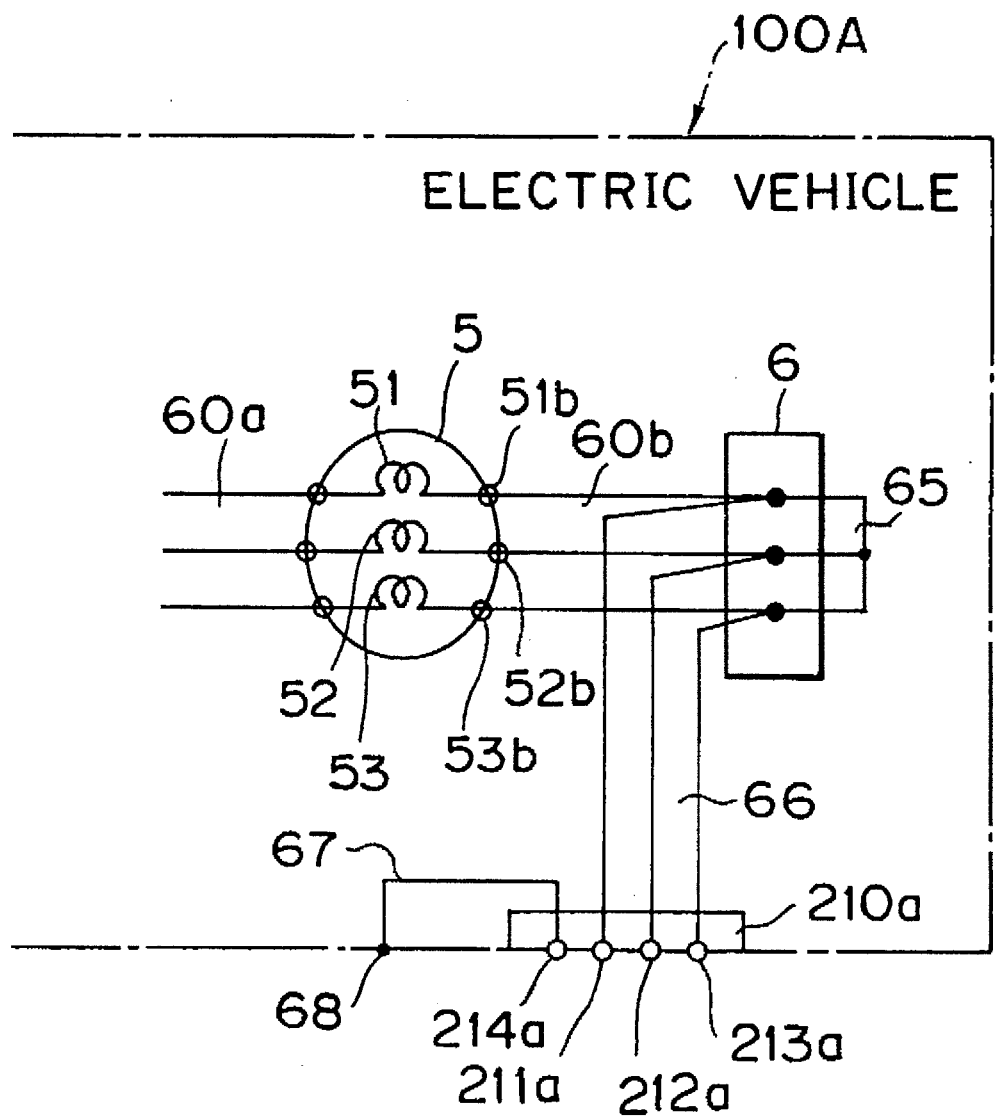
FIG. 10 is a circuit diagram showing a major portion of the embodiment during the power running.

First, the electric vehicle 100A is driven by closing the triple pole contactor 6. FIG. 10 shows this condition in which the ends 51a, 52a and 53a of motor windings 51, 52 and 53 are shortcircuited by the shortcircuit line 65 via the contactor 6, and the windings 51, 52 and 53 form a Y connection. As a result, the motor 5 is driven by the inverter 4 as a Y-connection motor, and is operated as a normal motor for driving the electric vehicle.

During the driving operation, nothing is connected to terminals 211a, 212a and 213a of the charging connector 210a and a ground terminal 214a. When the triple pole contactor 6 is closed, the charging connecting lines 66 are shortcircuited, and hence, the terminals of the charging connector 210a are also shortcircuited. As a result, the motor voltages do not appear at the terminals 211a, 212a and 213a, and hence, they are safe during the driving operation even if they are not shielded.

On the other hand, if an abnormal operation such as a fault occurs during the drive operation of the electric vehicle, a protection circuit (not shown in FIG. 10) becomes operative in response to this abnormal operation. This will open the triple pole contactor 6. At this time, although the voltages of the motor appear between the terminals 211a, 212a and 213a of the charging connector 210a, this presents no problem in terms of safety because the abnormal operation is immediately removed either by interrupting the operation of the inverter, or by opening the main contactor 2 and the fuse 3.

Next, referring now to FIG. 11, the charging operation of the secondary battery 1 will be explained. First, the triple pole contactor 6 is opened while the inverter 4 is not operated. Thereafter, a charging connector 210b of the charging cable 200 is connected to the charging connector 210a.

Figure 11:
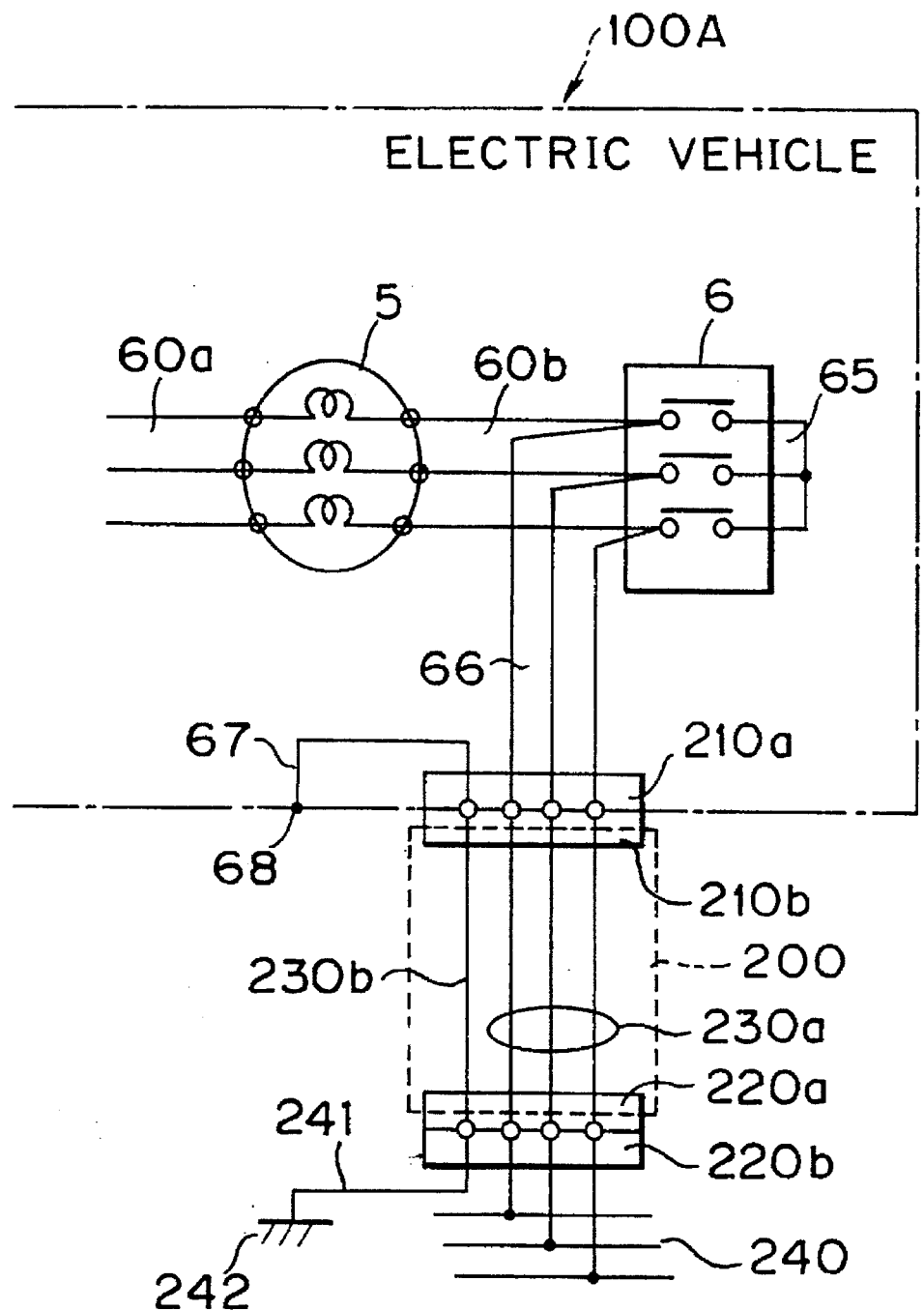
FIG. 11 is a circuit diagram showing the major portion of the embodiment during the charging operation.

In FIG. 11, the charging cable 200 comprises the connector 210b, a connector 220a connected to a connector 220b on the side of the power distribution system 240, and connecting lines consisting of charging connecting lines 230a and a ground connecting line 230b, which connect the connectors 210a and 220a.

Here, the charging connecting lines 230a are connected to the power distribution system 240 via the connectors 230b and 220b, whereas the ground connecting line 230b is connected to a ground line 241 via the connectors 230b and 220b. This ground line 241 is connected to earth 242.

Figure 12:
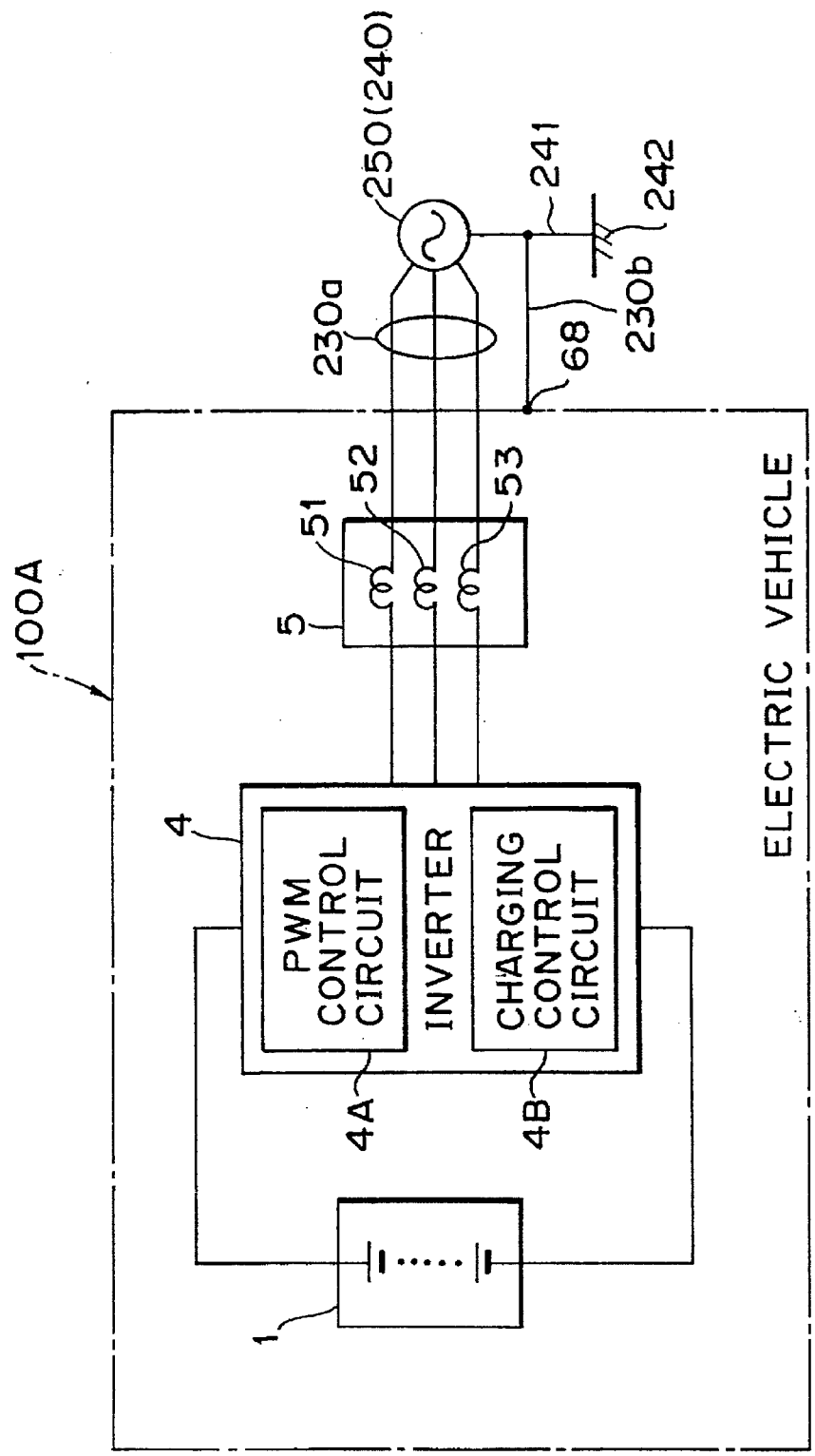
FIG. 12 is a schematic circuit diagram showing the connection during the charging operation in the embodiment of FIG. 9.

FIG. 12 is a circuit diagram illustrating the charging operation. The windings 51, 52 and 53 of the motor function as reactors. The charging power is supplied from an AC power source 250 of the power distribution system 240 to the inverter 4 via the windings 51, 52 and 53. The inverter 4 converts the AC power into DC power to charge the secondary battery 1 in an operation similar to that during the above-described regenerative braking operation.

The inverter 4 includes a PWM control circuit 4A for performing the PWM control, and a charging control circuit 4B for controlling the charging operation. The charging control circuit 4B controls the battery current and battery voltage during the charging operation. In addition, a protection circuit 6A (see FIG. 9) is provided for detecting failures of the inverter and the motor during the power running of the electric vehicle. The protection circuit 6A opens the contactor 6 when a failure is detected.

The neutral line or one of the lines of the power distribution system 240 is grounded to earth 242 via the ground line 241. The vehicle body 110 of the electric vehicle 100A is also grounded through the ground line connecting portion 68, the ground connecting line 230b, and the ground line 241.

Figure 13:
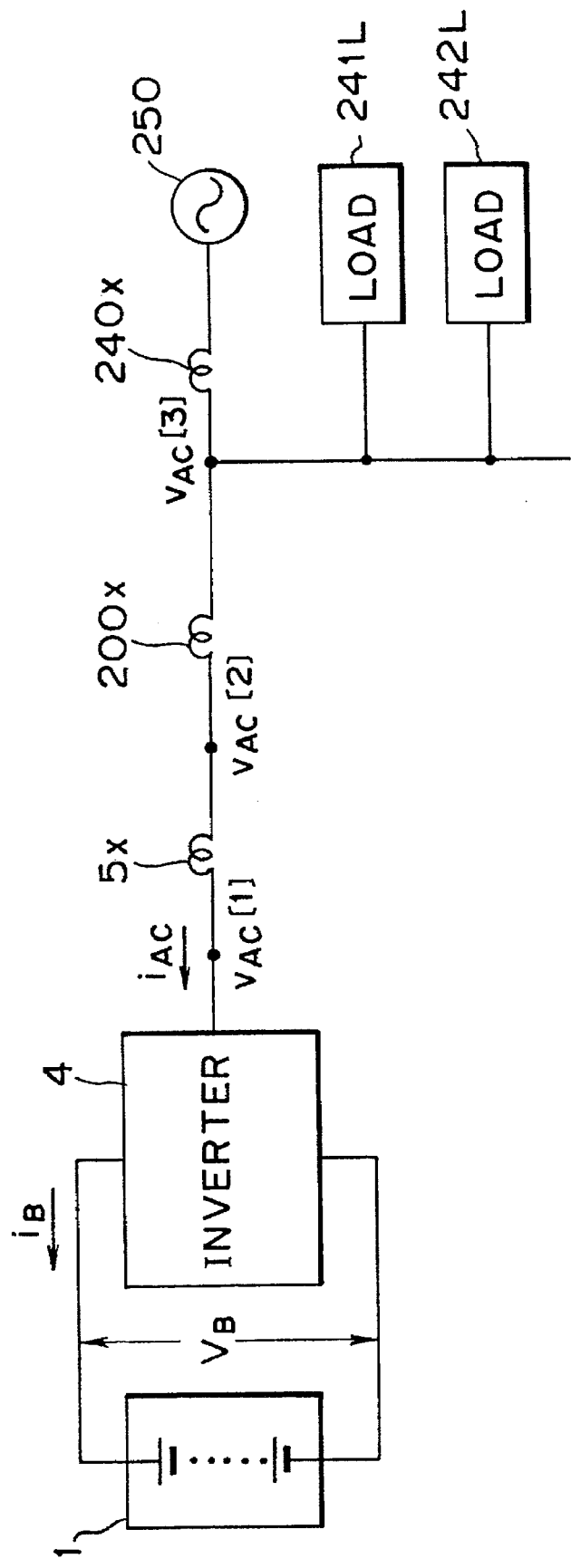
FIG. 13 is an equivalent circuit diagram during the charging operation in the embodiment of FIG. 9.
Figure 14:
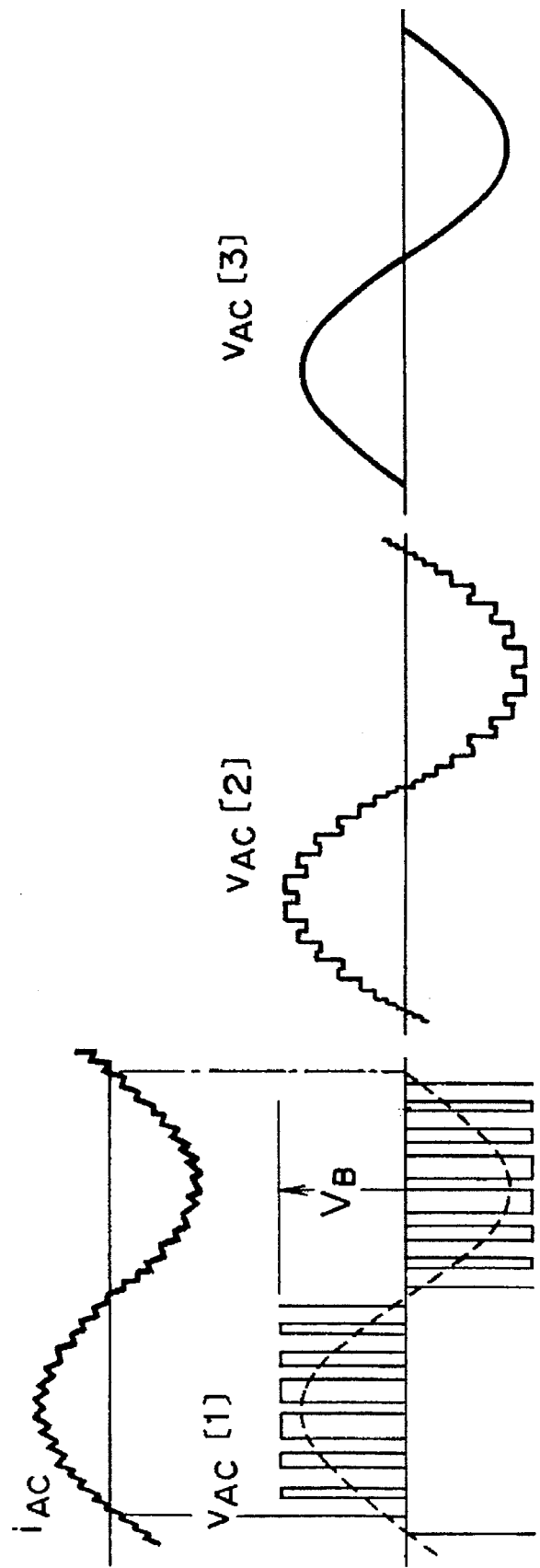
FIG. 14 is a diagram illustrating voltage and current waveforms at various portions of FIG. 13.

FIG. 13 shows an equivalent circuit for charging the secondary battery in this embodiment, and FIG. 14 shows voltage/current waveforms of various portions in FIG. 13.

In FIG. 13, the reference numeral 5x denotes the reactance of the windings 51, 52 and 53 of the motor 5, the reference numeral 200x denotes the reactance of the charging cable 200, the reference numeral 240x designates the reactance of the power distribution system 240, and the reference numerals 241L and 242L designate other AC loads connected to the power distribution system 240.

In addition, $V_B$ is the voltage of the secondary battery 1, $i_B$ is the current of the secondary battery 1 during the charging operation, $i_{AC}$ is the AC-side current of the inverter 4 during the charging operation, and $V_{AC}$ is the AC-side voltage of the inverter 4.

In general, since the inverter 4 is PWM-controlled by a frequency higher than several kHz, the current $i_{AC}$ supplied from the power distribution system 240 becomes a sinusoidal current whose power factor is approximately 1, with a small amount of high-frequency ripples, as shown in FIG. 14.

The AC-side voltage $V_{AC}$ Of the inverter 4 has a PWM waveform, the peak value of which is equal to the battery voltage $V_B$, as indicated by $V_{AC}[1]$.

Since the reactance 5x is much greater than the reactance 200x or 240x, a greater part of harmonics of the PWM waveform is absorbed by the reactance 5x, and the voltage at the connectors 210a and 210b of the electric vehicle 100A becomes close to a sine wave as indicated by $V_{AC}[2]$. The voltage at the connectors 220a and 220b on the side of the power distribution system 240 further approaches a sine wave, as indicated by $V_{AC}[3]$.

Since the power source voltage applied to other AC load 241L or 242L connected to the power distribution system 240 is close to a sine wave as shown by $V_{AC}[3]$, the charging operation of the electric vehicle 100A has substantially no influence on the power source system.

As previously explained, in accordance with the present invention, the phase windings of the AC motor are interposed between the external AC power source and the inverter for driving the AC motor. Thus, using the reactance of the phase windings, the secondary battery is charged by the inverter to which the power is supplied from the external AC power source.

It must be fully considered that the electric vehicle should never start to move during the charging operation by producing torque.

This will be described in more detail. First, the situation when an induction motor is used will be described.

Figure 15:
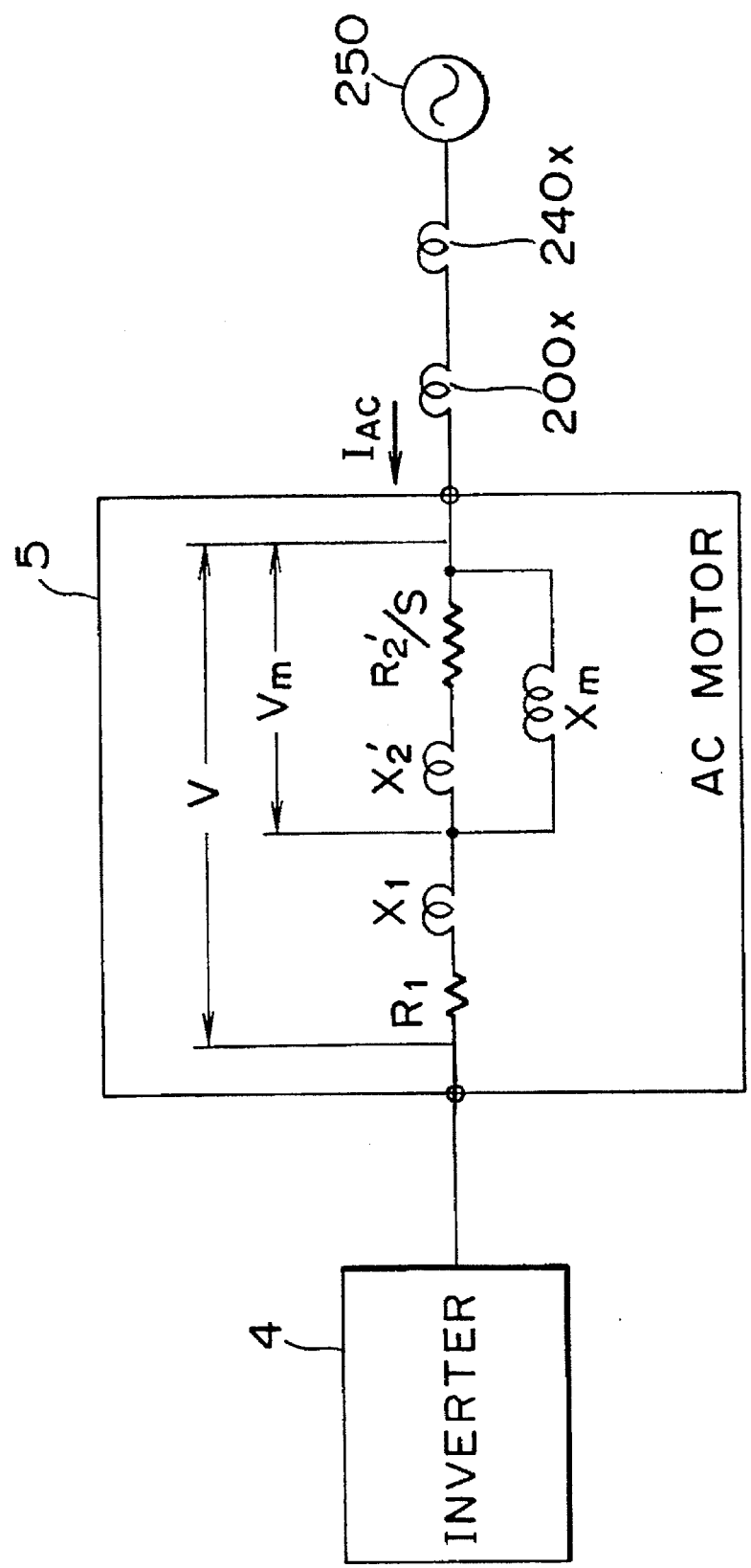
FIG. 15 is an equivalent circuit diagram of the major portion when an induction motor is employed as an AC motor in the embodiment of FIG. 9.
Figure 16:
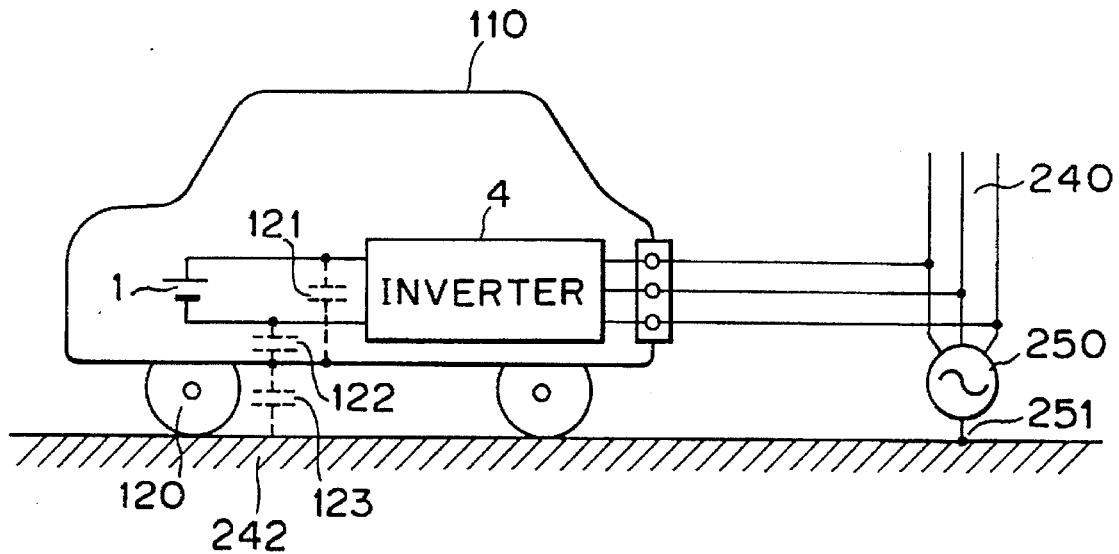
FIG. 16 is an equivalent circuit diagram during the charging operation in the embodiment of FIG. 9.
Figure 17:
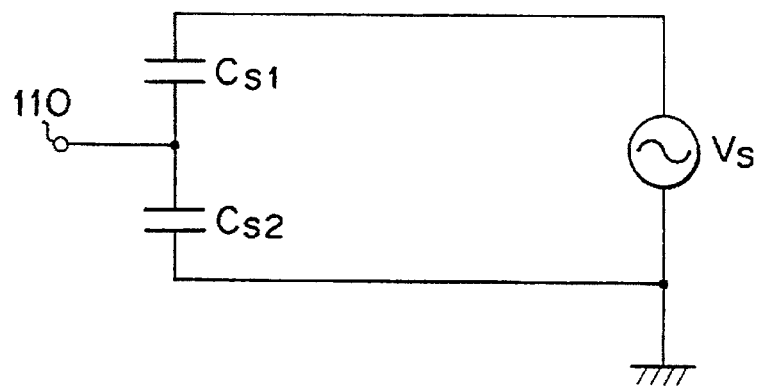
FIG. 17 is a circuit diagram illustrating the vehicle body potential in FIG. 16.

FIG. 15 is an equivalent circuit of a major portion when an induction motor is employed as the AC motor 5. The equivalent circuit of the AC motor (induction motor) 5 itself is well known.

In this figure, $X_1$ and $R_1$ are the leakage reactance and the winding resistance of the stator windings. Normally, since $X_1 \gg R_1$, the winding resistance $R_1$ is negligible. $X_2'$ and $R_2'$ are the reactance and the resistance of a rotor. S is a slip, Xm is an exciting reactance, V is a voltage applied to the motor 5, and Vm is an exciting voltage in the voltage V.

During the charging operation of the secondary battery 1, the electric vehicle is stopped. In this case, the slip S is 1.0 because the rotation frequency is zero Normally, $X_1+X_2' \gg R_2'$, when the slip S is equal to 1.0, and hence, $R_2'$ is negligible.

Normally, $X_1+X_2'$ is on the order of 10% in terms of % reactance. This means that the motor voltage V is on the order of 10% of the rated voltage when the current $I_{AC}$ during the charging operation is equal to the rated current of the motor 5. Furthermore, since $X_1$ and $X_2'$ are substantially equal to each other, the exciting voltage Vm is on the order of 5% of the rated voltage.

Since the torque produced by an induction motor is proportional to the square of the voltage, the torque produced during the charging operation is equal to the rated torque multiplied by $(5/100)^2$, that is, 0.25% of the rated torque.

As is apparent from the foregoing explanation, there is no risk that the electric vehicle will start to move because the torque produced by the induction motor is very small.

Next, the case will be described in which a permanent magnet synchronous motor is employed as the AC motor 5.

The torque acting on the rotor of a permanent magnet synchronous motor is proportional to the motor current because the magnetic flux of the rotor is constant. During the charging operation of this embodiment, however, no torque to move the electric vehicle is produced because the rotor is being stopped and the motor current is an AC current having the frequency of the commercial power source. Accordingly, the average torque acting on the rotor becomes zero, and hence, no torque to move the electric vehicle is produced.

Thus, since the torque generated during the charging operation of this embodiment is very small, there is no risk of the electric vehicle starting to move. Of course, it is preferable to use braking control (parking brake) during the charging operation for the sake of safety.

It should be noted that during the charging operation, the charging voltage of the secondary battery 1 is preferably selected to be higher than the AC-side voltage of the inverter 4, namely the sinusoidal peak value of the AC voltage of the power source 250 in the power distribution system 240.

This is because if the battery voltage were lower than the sinusoidal peak value, an excessive and uncontrollable charging current would flow through the diodes constituting the inverter 4, and hence the fuse 3 would be melted down due to the excessive current, so that the charging circuit would be opened. A battery voltage slightly lower than the peak value, however, is allowable because this excessive current is suppressed by the internal resistance of the battery.

Although not shown in the drawing, it is preferable to interpose a protection device such as a fuse between the power distribution system 240 and the AC side of the inverter 4 in order to protect the circuit during the charging operation.

According to this embodiment, the inverter 4, which has not been used during the conventional charging operation, is utilized as the AC-to-DC converting apparatus to charge the secondary battery 1.

Consequently, adding only the connecting lines 65 and 66, the connector 210a, and the charging control circuit 4a to the conventional electric vehicle 100, and only the charging cable 200 to the power system, enables the secondary battery 1 to be charged. As a result, a very cheap and small charging system can be implemented.

Furthermore, the power factor one charging operation becomes possible by PWM controlling the inverter 4 because the current $i_{AC}$ supplied from the power distribution system 240 to the electric vehicle 100 during the charging operation becomes a nearly perfect sine wave with little distortion as illustrated in FIG. 14. As a result, there is no risk of degrading the power quality of the power distribution system 240.

Although the external AC power source is a 3-phase power distribution system 240 in the embodiment describe above, the present invention can also be applied to an external power source of a single phase power distribution system.

The present invention has been described in detail with respect to an embodiment, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. An electric system of an electric vehicle comprising:
   a main secondary battery;
   a power converter converting DC power of the main secondary battery into AC power, the power converter having a regenerative function enabling AC to DC conversion;
   an AC motor driving wheels of the electric vehicle, the AC motor including windings whose first terminals are connected to the AC side output of the power converter;
   a switch including a plurality of switching circuits, first terminals of the switching circuits being each connected to second terminals of the windings, second terminals of the switching circuits being shortcircuited; and
   a charging connector to be connected to an external AC power source while charging the main secondary battery, the charging connector being connected to the first terminals of the switching circuits of the switch.

2. The electric system of an electric vehicle as claimed in claim 1, wherein the charging connector comprises a ground terminal to be connected to ground, the ground terminal being connected to a body of the electric vehicle via a ground line of the body.

3. The electric system of an electric vehicle as claimed in claim 1, wherein the switch is closed during the power running of the electric vehicle.

4. The electric system of an electric vehicle as claimed in claim 3, wherein the switch is opened by a protection circuit if a failure occurs during running of the electric vehicle.

5. The electric system of an electric vehicle as claimed in claim 2, wherein the switch is opened during the charging operation of the main secondary battery so that the main secondary battery is charged via a charging cable, the charging connector, and the ground line.

6. The electric system of an electric vehicle as claimed in claim 5, wherein the ground terminal of the charging connector is grounded via a ground connecting line within the charging cable.

7. The electric system of an electric vehicle as claimed in claim 5, wherein the power converter is PWM-controlled by a control circuit during the charging operation of the main secondary battery.

8. The electric system of an electric vehicle as claimed in claim 5, wherein the AC power source is either a single-phase or a three-phase power distribution system.

9. The electric system of an electric vehicle as claimed in claim 5, wherein a voltage peak value of the AC power source is determined at a value lower than the voltage of the main secondary battery.

10. The electric system of an electric vehicle as claimed in claim 5, wherein the wheels are automatically braked with a parking brake during the charging operation of the main secondary battery.

11. The electric system of an electric vehicle as claimed in claim 5, wherein a fuse is connected between the AC power source and the AC side of the power converter.

12. An electric vehicle for use with a battery, comprising:
    an AC motor having a plurality of windings;
    means for selectively connecting the windings to one another or isolating the windings from one another;
    an inverter connected between the battery and the windings; and
    a charging connector, connected to at least one of the windings, to receive power from an external AC power source for charging the battery through said at least one of the windings and the inverter when the windings are isolated from one another.

13. The electric vehicle of claim 12, wherein the windings of the motor have first and second ends, wherein the first ends of the windings are connected to the inverter, and wherein the means comprises means for selectively connecting the second ends of the windings to one another or isolating the second ends of the windings from one another.

14. The electric vehicle of claim 13, wherein the motor is a three-phase motor whose windings are Y-connected when the means connects the second ends of the windings to one another.

15. The electric vehicle of claim 13, wherein the means comprises a plurality of switches having first and second terminals, the first terminals of the switches being connected to the second ends of the windings and the second terminals of the switches being connected to one another.

16. The electric vehicle of claim 12, wherein the means comprises switches connected to the windings.

17. The electric vehicle of claim 12, wherein the vehicle has a body, and wherein the charging connector has a plurality of terminals, including a ground terminal that is connected to the body.

18. an electric vehicle for use with a battery, comprising:

an AC motor having first and second windings;

an inverter connected between the battery and the windings;

a switch to selectively connect the windings to one another or isolate the windings from one another; and a charging connector, connected to the switch, to receive power from an external power source for charging the battery.

19. The electric vehicle of claim 18, wherein the AC motor additionally has a third winding, the third winding being connected to the inverter, and further comprising at least one further switch to selectively connect the third winding to at least one of the first and second windings.

20. The electric vehicle of claim 19, wherein the motor is a three-phase AC motor and the windings are connected in a Y configuration when they are selectively connected by the switches.

* * * * *